J. S. WILSON.
Speed-Measure.

No. 196,407. Patented Oct. 23, 1877.

Witnesses
Parks McFarland, Jr.
John F. Grant

Inventor
Joseph Shields Wilson
per Edward Brown,
Attorney.

UNITED STATES PATENT OFFICE.

JOSEPH SHIELDS WILSON, OF PHILADELPHIA, PENNSYLVANIA, ASSIGNOR TO EDWARD BROWN, OF SAME PLACE.

IMPROVEMENT IN SPEED-MEASURES.

Specification forming part of Letters Patent No. 196,407, dated October 23, 1877; application filed March 11, 1874.

*To all whom it may concern:*

Be it known that I, JOSEPH SHIELDS WILSON, of Philadelphia, Pennsylvania, have invented an Improved Revolution-Indicator, of which the following is a specification:

The object of my invention is to construct an instrument which shall indicate, simply by inspection and without the use of a watch, the number of turns made per minute by the fly-wheel of a steam-engine or other rotating piece of machinery.

It consists in securing a glass tube, by means of a central stuffing-box, to a rotating ribbed cup, thus making the tube, to turn with the cup. The upper end of the tube is steadied in its rotation by a fixed arm projecting from the bracket in which the mercury-cup turns.

By this arrangement the rotating cup and the glass indicating-tube always keep the same relative positions, whatever may be the amount of wear in the journals of the mercury-cup, the friction of the revolving mercury against the stationary fluid in the glass column is avoided, and the instrument rendered more permanently accurate than those heretofore in use.

Figure 1:
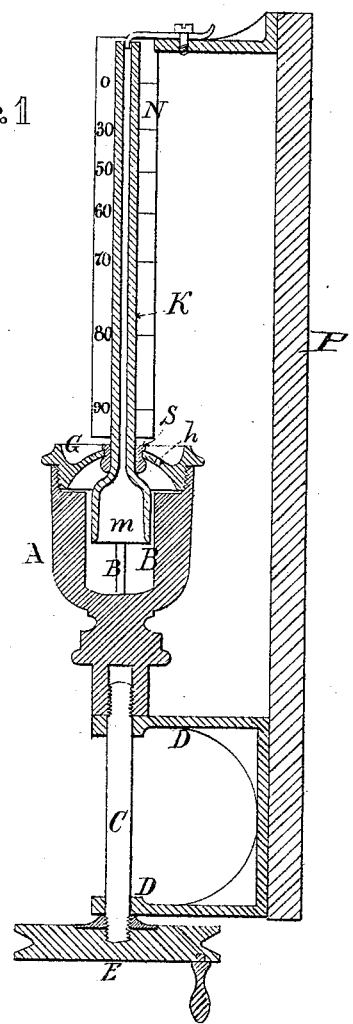
Figure 2:
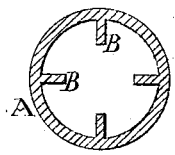

Figure 1 is a vertical section through the instrument, and Fig. 2 is a horizontal section through the mercury-cup.

A is an iron cup, cast with ribs B on the inside. This cup is mounted on a shaft, C, in suitable bearings D. A pulley, E, upon the shaft gives the motion of the engine to the instrument. G is the lid of the cup screwed on.

A central hole is made in the lid, in which a ring of india-rubber, S, is fitted, and another small hole is made at *h* for the admission of air.

The glass tube K is inserted from the under side of the lid through the india-rubber ring, and projects above the lid from six to twelve inches or more. The india-rubber ring fits tight in the lid, and also against the glass tube, to support the tube and cause it to rotate with the cup.

The glass tube is enlarged at its lower end *m*, which enlargement dips into the mercury, and forms a seal therewith, to prevent the colored water in the tube from falling out. The upper end of the glass tube is steadied in its rotation by an arm projecting from the upright P. This arm also carries the scale-plate N.

The cup A is filled with mercury to a point above the bottom of the glass tube, and the glass tube is filled with colored water up to 0 on the scale. As soon as the instrument is put in motion the mercury in the cup assumes a hollow form, and the fall of the liquid in the glass tube indicates upon the scale-plate N the turns made per minute.

I claim—

In a revolution-indicator, a glass indicating-tube secured to and revolving with a mercury-receptacle communicating therewith.

JOSEPH SHIELDS WILSON.

Witnesses:
JOHN F. GRANT,
HORACE LEE.